May 28, 1957  W. GALLAY ET AL  2,793,399
REPRODUCTION OF ARTICLES
Filed Feb. 13, 1953
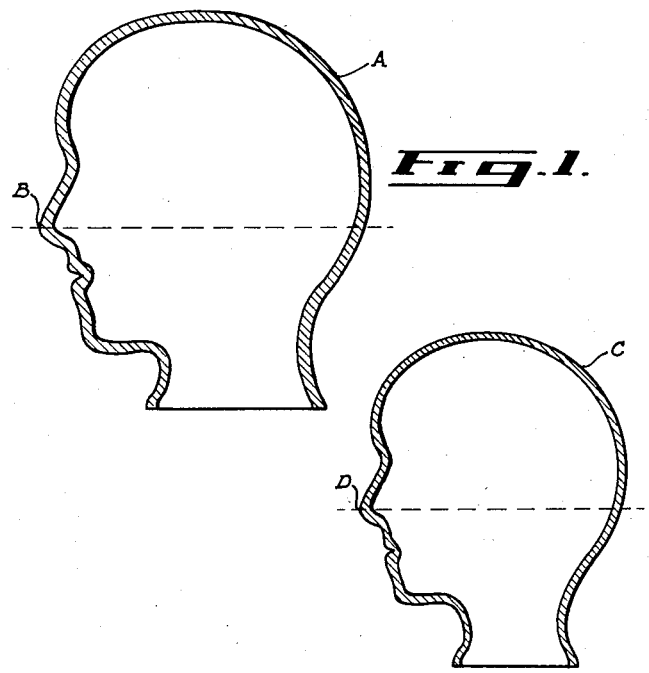
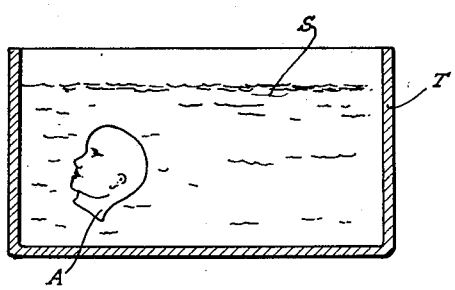
INVENTORS.
WILFRED GALLAY
HAROLD MILLER
BY
Mock & Blum
ATTORNEYS

United States Patent Office 2,793,399
Patented May 28, 1957

2,793,399

REPRODUCTION OF ARTICLES

Wilfred Gallay, Rockcliffe, Ottawa, and Harold Miller, Toronto, Ontario, Canada, assignors to Reliable Toy Co., Limited, Toronto, Canada, a corporation of Canada Application February 13, 1953, Serial No. 336,854

8 Claims. (Cl. 18—48)

This invention relates to a new and improved method of making a substantially accurate replica of an original or master object on a reduced scale. The master object may be three-dimensional or it may be a surface design which is produced by engraving or embossing or other means. The invention also includes the reduced replica.

Without limitation thereto, this invention may be illustrated by a preliminary explanation of the problems which arise in the reproduction on various scales of articles such as dolls' heads, and of the application of this invention to the solution of such problems.

It is frequently desired to produce certain types of molded articles, for example, dolls' heads, in various sizes, all of which are perfect replicas of each other except for their scale. This is difficult of accomplishment by previously known methods. Such methods would involve not only the construction of the original model by hand, from which a die is manufactured to be used in the molding process, but also the reproduction by hand of models on a reduced or enlarged scale. Considerable skill and a prolonged expenditure of time would be required to achieve a satisfactory result. Cumbersome and costly equipment is available for making mechanical reproductions to scale of various articles, but the cost of this is prohibitive and its effectiveness for such purposes as the reproduction of the delicate features of a doll is doubtful.

The foregoing problem is solved in accordance with this invention by making a master pattern equal in scale to the largest member of the family of articles. This master pattern may be of wood, wax, plastic or any other suitable material or it may be of shrinkable plasitc material including a resin and a plasticizer. Where the master pattern is of wood, wax or is made from a plastic low in plasticizer, a duplicate is made by well known, conventional methods. This duplicate is made from a plastic including as its main constituents a resin and a plasticizer for the resin the plastic being shrinkable by the removal of the plasticizer. The die for the largest member of the family of molded articles may be made from the original master pattern or from the plastic duplicate. A solvent for the plasticizer in which the resin is substantially insoluble is applied to this plastic duplicate to leach out the plasticizer leaving a reduced replica of the duplicate. This reduced replica is used to make a die for the manufacture of another member of the family of molded articles, and to make a shrinkable plasticized plastic article for use in obtaining further members of the family on a reduced scale. If desired, the reduction in scale can be accomplished in several such steps between a pattern for one member of the family and the pattern for the next smaller member. If the starting material is a shrinkable plastic, the first step of producing a duplicate will be omitted.

While this invention has been initially explained with reference to the production of dies for a family of molded articles, it will be appreciated that the inventive concept has wider applications. This invention comprehends in its broader aspect the obtaining of reproductions of articles on a reduced scale for any purpose. For example, it might prove convenient to a designer to make a model on a large scale and then obtain a reduced replica in accordance with this invention so as to facilitae the obtaining of fine detail. As another example, the die itself could be formed of plasticized plastic material. Duplicate dies could be made and one of these reduced in scale by a solvent for the plasticizer. The other die and the reduced die could then be electrolytically plated to provide mold surfaces.

This invention is particularly useful for making dies for slush molding where a hollow master metal mold is made by electroforming. The model is coated with graphite or metallic powder and a metal coating is electro-deposited thereon. In the slush molding process the liquid starting composition which normally comprises a resin, a plasticizer and a stabilizer is applied to the interior wall of the hollow master metal mold in order to form a thin liquid film. The mold is then heated to set this liquid film into final solid shell form. The thin solid and hollow shell which is thus formed is removed from the mold. This thin solid and hollow shell is flexible and has some elasticity.

The slush molding technique can conveniently be used, not only for making the final commercial articles such as dolls' heads, but also for making the master head to be shrunk in accordance with this invention to provide a plurality of substantially accurate replicas of the original or master mold in successively smaller sizes.

Many plasticized plastics are suitable for this invention to a greater or lesser extent. Some materials, however, have been found to give a degree of distortion or to develop cracks when a large amount of plasticizer is extracted. The results obtained with such materials may be satisfactory, however, where it is desired to achieve only a slight reduction in size. Highly plasticized polyvinyl chloride and polyvinyl chloride acetate have been found to be particularly suitable as giving a high degree of reduction without appreciable distortion or cracking. Good results have also been achieved with ethyl cellulose. Less satisfactory results have been obtained with cellulose acetate resin and this is not recommended where an extensive reduction is desired. Other plasticized plastics may be used such as nylon, polyvinyl butyral, cast methyl methacrylate including a plasticizer, plasticized cellulose nitrate. Substantially unplasticized plastics such as polystyrene and normal formulations of thermosetting resins cannot, of course, be expected to be suitable.

The plasticizer will vary according to the composition of the resin. In most cases a wide range of plasticizers is available and in selecting a suitable plasticizer the availability should be considered of selective solvents which will remove the plasticizer without substantially attacking the resin. In the case of polyvinyl chloride resin, dioctyl phthalate exemplifies a suitable plasticizer. Other compatible plasticizers may be used including various waxes, aryl phosphates, various dialkyl phthalates, triphenyl phosphate, and many others which are disclosed in the technical literature.

A stabilizer for the plastic may, if desired, be included in the formulation, such as lead silicate for a polyvinyl chloride resin. Since, however, the master article is being formed for temporary purposes and will usually be immediately reduced, the stabilizer may, if desired, be omitted. Where the binder is polyvinyl chloride resin and the plasticizer is dioctyl phthalate, suitable selective solvents for the plasticizer are exemplified by ethyl alcohol, ethyl acetate and mixtures thereof. Ethyl alcohol in the form of a commercial 95% solution will be satisfactory but appreciable quantities of additional water should not be added in order to preserve its effectiveness as a solvent. Other selective solvents such as diethyl ether may be used.

According to one preferred embodiment of this invention, to which the invention is not limited, the material of the finished molded master or original head includes a larger proportion of plasticizer than according to current practice. Thus, as one example of a preferred embodiment, the material of the finished master head consists substantially of one hundred parts by weight of polyvinyl chloride resin, one hundred parts of dioctyl phthalate plasticizer and three parts of lead silicate stabilizer. The thickness of the flexible solid wall of the hollow master or original head is 0.060 inch or about 1.5 millimeters. The composition of the illustrative finished master head consists substantially of 49% of polyvinyl chloride, 49% of plasticizer, and 2% of stabilizer. These proportions are by weight.

In this example, the finished master head is kept immersed in the selective solvent at ordinary room temperature of 20° C.–25° C., or at more elevated temperatures, during a selected immersion period, in order to dissolve and remove a selected part of the plasticizer from the immersed master head. This plasticizer is an example of a removable ingredient of the master head.

The removal of some or all of the plasticizer uniformly shrinks the immersed master head, so that a reduced and sufficiently accurate replica of the molded master head is thus produced. For convenience, this reduced replica is designated as the first reduced replica.

This first reduced replica is removed from the selective solvent, and it is then washed with water to remove all traces of the selective solvent and it is then dried.

The first reduced dried replica has less flexibility than the master head, but this is not a disadvantage, as the first reduced replica is used for the temporary purpose of providing a pattern for a die.

This first reduced replica of the original head can be used to make a mold for a second head which has the same composition and thickness as the original or master head.

This second molded head can be shrunk as above described in order to produce a second substantially accurate reduced replica of the master head. This second reduced replica is washed and dried and it is used as a model to make a mold for a third head which is a substantially accurate reduced replica of the original master head.

These steps can be repeated, in order to produce a series of substantially accurate replicas of the original or master head, in successively reduced sizes.

The foregoing steps also have the effect of producing a series of successively reduced replicas of the original or master mold, the master mold being the mold made from the master head as a pattern.

The dolls' heads or other articles made from the series of molds or dies may be of any suitable material, including both thermoplastic and thermosetting resins and other materials. A plasticizer, except where ordinarily used due to the nature of the material, is not necessary as the reducing method of this invention is preferably contemplated as being used only for the production of a series of molds from which the commercial articles are made directly.

This invention is most readily applicable to articles such as hollow dolls' heads which are of thin wall thickness. If there is a thick wall thickness more time will be required for the removal of the plasticizer, and in extreme cases it may be difficult to remove the plasticizer from the central portion of the wall within a reasonable time and without some removal of or distortion of the binder at the surfaces. In this connection a thin wall thickness is used to refer to wall thicknesses varying from a minimum thickness of self-supporting film to about half an inch. A typical wall thickness for the reproduction of models for the slush molding technique previously referred to is one sixteenth of an inch.

If desired, finely divided fillers, such as silica and mica, can be included with the shrinkable plastic composition. But as these will reduce the extent to which the material can be reduced, it is preferred that the fillers be omitted.

The invention is not limited to the reproduction of a shrinkable master article of sufficient flexibility for all mold forming techniques. If a small degree of reduction is contemplated the master article may be substantially rigid. Usually, however, the high degree of plasticization preferred automatically results in flexibility. The master mold could be formed from this master article in two halves of the master article. As pointed out previously, reduced reproductions of non-shrinkable models can be obtained by first making a shrinkable duplicate.

The invention is further disclosed in the annexed description and drawings.

Figure 1 is a vertical section of a master doll's head.

Figure 2 is a vertical section of the first reduced replica of said master head.

Figure 3 illustrates the immersion step. The doll's head is only diagrammatically shown in Figure 3.

*Example No. 1*

The original or master molded hollow head A is shown in Figure 1. The thickness of its wall is 0.060 inch or about 1.5 millimeters. Figure 1 and Figure 2 are substantially to scale.

The composition of the master head A consists substantially of 49% of polyvinyl chloride, 49% of dioctyl phthalate and 2% of lead silicate. These proportions are by weight. The point B in Figure 1 indicates the widest horizontal section of the molded master head A. This horizontal section has a circumferential length of 17 inches or about 425 millimeters. The dry weight of the master molded head A is substantially 8 ounces or about 225 grams.

The polyvinyl resins are resistant to alcohols and insoluble in aliphatic hydrocarbons, amyl acetate, butyl acetate, ethyl acetate, and other organic solvents. Hence numerous solvents can be used to extract plasticizers from vinyl resin. Ethyl alcohol and other alcohols soften the polyvinyl resins, but do not substantially dissolve said resins.

The selective solvent in this example is made by mixing commercial ethyl alcohol with commercial ethyl acetate. This commercial ethyl alcohol contains 95% of ethyl alcohol by weight. The commercial ethyl acetate contains 85% to 88% of ethyl acetate by weight. Three parts of said commercial ethyl alcohol are mixed with one part of said commercial ethyl acetate. This ratio is by weight. The ethyl alcohol also acts as a softening agent so that the solvent can more readily penetrate the wall of head A. The selective mixed solvent S is put into a tank T. The master molded head A is immersed in the pool of solvent S, as shown in Figure 3. The solvent and the immersed head A are maintained at a temperature of 20° C.–25° C. The tank T is located in air at atmospheric pressure. The immersion period in the example is forty-eight hours. During this immersion period the original head A shrinks uniformly. The selective solvent S penetrates the thin wall of the head A during this immersion period and it dissolves and extracts at least some of the dioctyl phthalate plasticizer. The polyvinyl chloride and the lead silicate are substantially insoluble in the selective solvent S. The extraction of the plasticizer is rapid at first, and such extraction then proceeds more slowly so that there is only slight extraction at the end of this immersion period of forty-eight hours. At the end of this immersion period, the immersed head has the shape and size of the first reduced replica C which is shown in Figure 2. This first reduced replica C is sufficiently accurate to be used as a model for the purpose of making a substantially reduced duplicate of the master mold. This first reduced replica C is removed from the tank T at the end of the immersion period. The first reduced replica C is then thoroughly washed with water, in order to remove the selective solvent therefrom. It is then dried and used as a model to make a mold of the same size. In an actual test, the dry weight of the first reduced replica was 5.2 ounces or about 147 grams, so that there was a loss in weight of about 35% which resulted from the extraction of the plasticizer.

In such actual test, the circumferential length of the widest cross-section of the first reduced replica, which is indicated at D in Figure 2, was 14 inches or about 325 millimeters. This corresponded to a shrinkage of about 17.7%. The shrinkage of the master head A was substantially uniform in this test. The period of extraction can be reduced to about 15 hours, with the same amount of substantially uniform shrinkage, if the temperature of the solvent S and of the immersed head is maintained at substantially 49° C. The factors which control the degree of shrinkage are the period of extraction, the temperature of extraction, the selective solvent, the thickness of the head or other article which is being treated, the nature of the resin, and the proportion of plasticizer or other removable material in the head or other article. A dimensional shrinkage of about 15% is normal, using the method set forth in Example 1.

In this test, the dried replica C was strong and coherent, and it was easily used as a model in order to make a reduced replica of the master mold which had been used to make the head A. This reduced replica mold was sufficiently accurate to make a substantially accurate reduced replica of the original molded head A.

In this example, slush molding was used to make the original molded head A, and the reduced replica mold was also used in slush molding.

If the resin is cellulose acetate, which as has been noted, gives far less satisfactory results than polyvinyl chloride, the plasticizer is exemplified by dimethyl phthalate, dibutyl tartrate, triacetin and glyceryl triacetate. Cellulose acetate is softened by alcohols, but it is substantially insoluble therein. Ethyl alcohol can therefore be used to remove plasticizers which are soluble in ethyl alcohol. Ethyl acetate should not, however, be used, as cellulose acetate is soluble in ethyl acetate.

The plasticizers for ethyl cellulose may be selected from a wide range, including the plasticizers which have been mentioned for polyvinyl chloride and various waxes, oils, esters, ethers. However, some of these plasticizers such as plasticizing oils, for example, castor oil, should be avoided due to the difficulty of extracting such plasticizers. Plasticizers such as those used with alkyl resins to give internal plasticization should also be avoided and more readily extractable chemical plasticizers should be used.

The plasticizers for cellulose plastics include ortho and para toluenesulfonamide. These are soluble in ethers. Some ethers such as diisopropyl ether have little effect on resins such as cellulose acetate butyrate and therefore may be used as selective solvents for these plasticizers.

It will be apparent that the method of this invention has wide applications. The possibility has already been mentioned of making reduced replicas of objects of metal or other non-plastic materials by first making a duplicate in a plastic material including an extractable plasticizer. The reduced replica can be used for making a die for the production of plastic articles which need not necessarily contain a plasticizer. The reduced replica could also, for example, be used as a pattern for a sand mold to provide duplicates of the reduced replica in metal.

The invention is further disclosed and defined in the appended claims.

We claim:

1. A method of shrinking a hollow article which has a solid wall which consists substantially of shrinkable thermoplastic plastic and a plasticizer for said thermoplastic plastic, which consists in immersing said hollow article in a liquid in which said plastic is substantially insoluble in and in which said plasticizer is soluble, and substantially uniformly shrinking said hollow article while it is thus immersed by dissolving said plasticizer out of said wall into said liquid, said shrinking being substantially completed while said hollow article is thus immersed by thus dissolving said plasticizer out of said hollow article during said immersion.

2. A method according to claim 1 in which said plastic is a polyvinyl resin.

3. A method according to claim 1 in which said liquid has a liquid softening agent which softens said plastic.

4. A method according to claim 1 in which said plastic is polyvinyl chloride, said plasticizer is dioctyl phthalate, and said liquid consists substantially of ethyl alcohol and ethyl acetate, and said hollow article is immersed in said liquid until its shrinkage is at least five percent.

5. A method of shrinking an article which consists substantially of a shrinkable thermoplastic plastic and a plasticizer for said thermoplastic plastic, which consists in immersing said article in a liquid in which said plastic is substantially insoluble and in which said plasticizer is soluble, and shrinking said article while it is thus immersed by dissolving said plasticizing said plasticizer out of said article into said liquid, said shrinking being substantially completed while said article is thus immersed by thus dissolving said plasticizer out of said article.

6. A method according to claim 3 in which said thermoplastic plastic is a polyvinyl resin.

7. A method of making a hollow and shrunk replica of a hollow master doll head, the wall of said hollow master doll head being solid and flexible and consisting substantially of a shrinkable thermoplastic plastic and a plasticizer for said plastic, which consists in immersing said hollow master doll head in a liquid in which said plastic is substantially insoluble and in which said plasticizer is soluble, and shrinking said hollow master doll head while it is thus immersed in said liquid by dissolving said plasticizer out of said head into said liquid, said shrinking being substantially completed while said master doll head is thus immersed by dissolving said plasticizer out of said master doll head during said immersion.

8. A method according to claim 7 in which said plastic is a polyvinyl resin, and said liquid is miscible with water.

References Cited in the file of this patent

UNITED STATES PATENTS

| 869,311 | Leuchter | Oct. 29, 1907 |
|---|---|---|
| 2,338,787 | Ushakoff | Jan. 11, 1944 |
| 2,565,316 | Lucas et al. | Aug. 21, 1951 |